(12) United States Patent
Yi et al.

(10) Patent No.: US 10,721,616 B2
(45) Date of Patent: Jul. 21, 2020

(54) SUBSCRIPTION INFORMATION DOWNLOAD METHOD, RELATED DEVICE, AND SYSTEM

(71) Applicant: Huawei Technologies Co., Ltd., Shenzhen (CN)

(72) Inventors: Qiang Yi, Beijing (CN); Shuiping Long, Beijing (CN); Ziyao Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/304,609

(22) PCT Filed: May 27, 2016

(86) PCT No.: PCT/CN2016/083756
§ 371 (c)(1),
(2) Date: Nov. 26, 2018

(87) PCT Pub. No.: WO2017/201756
PCT Pub. Date: Nov. 30, 2017

(65) Prior Publication Data
US 2019/0268757 A1 Aug. 29, 2019

(51) Int. Cl.
*H04W 8/20* (2009.01)
*H04W 76/10* (2018.01)
*H04W 60/00* (2009.01)

(52) U.S. Cl.
CPC ........... *H04W 8/205* (2013.01); *H04W 60/00* (2013.01); *H04W 76/10* (2018.02)

(58) Field of Classification Search
CPC . H04W 12/0023; H04W 12/04; H04W 12/06; H04W 8/183; H04W 8/205;
(Continued)

(56) References Cited

U.S. PATENT DOCUMENTS 9,392,457 B2 * 7/2016 Laden ................... H04W 12/06
10,075,840 B2 * 9/2018 Benn ................. H04W 12/0023
(Continued)

FOREIGN PATENT DOCUMENTS

| CN | 101730102 A | 6/2010 |
|---|---|---|
| CN | 102413457 A | 4/2012 |

(Continued)

OTHER PUBLICATIONS

Nec, et al., "SMARTER Use Case for IoT Device roaming," 3GPP TSG-SA WG1 Meeting #71, S1-152149, Belgrade, Serbia, Aug. 17-21, 2015, 3 pages.
(Continued)

*Primary Examiner* — Matthew C Sams
(74) *Attorney, Agent, or Firm* — Slater Matsil, LLP

(57) ABSTRACT

Embodiments of the present invention disclose a subscription information download method, a related device, and a system. The method includes: receiving, by a first network device, a first request, where the first request is sent by a terminal after connecting to and attaching to a first network when the terminal has no effective profile, and is used to request to establish a network connection for downloading a profile; establishing, by the first network device, the network connection used for downloading the profile; and returning a response message for the first request to the terminal device, to inform the terminal device that the network connection has been successfully established.

14 Claims, 9 Drawing Sheets

(58) Field of Classification Search
CPC .......................... H04W 8/20; H04W 12/00401; H04L 67/306; H04L 67/30; H04L 67/303; H04L 9/006; H04L 9/3234
See application file for complete search history.

(56) References Cited

U.S. PATENT DOCUMENTS

| | | | | |
|---|---|---|---|---|
| 2013/0157673 | A1* | 6/2013 | Brusilovsky | H04W 4/70 455/450 |
| 2013/0237203 | A1* | 9/2013 | Oertle | H04W 8/245 455/418 |
| 2013/0275556 | A1* | 10/2013 | Hjelm | H04L 63/126 709/217 |
| 2014/0219447 | A1* | 8/2014 | Park | H04W 12/08 380/247 |
| 2014/0237101 | A1* | 8/2014 | Park | H04W 4/50 709/223 |
| 2015/0148020 | A1* | 5/2015 | Laden | H04W 12/06 455/418 |
| 2015/0303966 | A1* | 10/2015 | Lee | H04B 1/3816 455/466 |
| 2015/0359026 | A1 | 12/2015 | Iwai et al. | |
| 2016/0286380 | A1 | 9/2016 | Long | |
| 2017/0161721 | A1 | 6/2017 | Han et al. | |

FOREIGN PATENT DOCUMENTS

| | | |
|---|---|---|
| CN | 103929469 A | 7/2014 |
| CN | 104703199 A | 6/2015 |
| CN | 105516962 A | 4/2016 |
| WO | 2013130598 A1 | 9/2013 |

OTHER PUBLICATIONS

3rd Generation Partnership Project; Technical Specification Group Services and System Aspects; Feasibility Study on New Services and Markets Technology Enablers; Stage 1 (Release 14), 3GPP TR 22.891 V14.0.0 (Mar. 2016), 95 pages.

3rd Generation Partnership Project; Technical Specification Group Services and System Aspects; Network based IP flow mobility (Release 13), 3GPP TR 23.861 V13.0.0 (Jun. 2015), 153 pages.

GSM Association, "Business Process for Remote SIM Provisioning in M2M," Version 1.0, GSMA White Paper dated Feb. 18, 2015, 26 pages.

* cited by examiner

SUBSCRIPTION INFORMATION DOWNLOAD METHOD, RELATED DEVICE, AND SYSTEM

CROSS-REFERENCE TO RELATED APPLICATIONS

This application is a National stage of International Application No. PCT/CN2016/083756, filed on May 27, 2016, which is hereby incorporated by reference in its entirety.

TECHNICAL FIELD

The present invention relates to the field of embedded universal integrated circuit card technologies, and in particular, to a subscription information download method, a related device, and a system.

BACKGROUND

An eUICC (Embedded Universal Integrated Circuit Card) is a third-generation telecommunication intelligent card. Power of the eUICC originates from the M2M (Machine to Machine) field. An increasing quantity of M2M devices need to be combined with an embedded SIM card (Subscriber Identity Module Card) in an apparatus in a manufacturing process. In addition to the field of M2M-type devices, for example, M2M apparatuses used for in-vehicle communications applications, the eUICC may also be applied to the field of consumer devices, for example, mobile phones and wearable devices.

An end user (End User) may load subscription information (profile) of an operator online into an eUICC of a terminal. In the prior art, a terminal device may connect to a network by using preset subscription information (Provisioning Profile, PP), to download a profile. However, the PP needs to be preset on terminal settings and has low utilization. An eUICC cannot communicate with another device in the network by using the PP, and the PP is only used to download the profile from the network. Therefore, a manner in which the eUICC downloads the profile by using the PP has high costs and low number resource utilization.

SUMMARY

Embodiments of the present invention provide a subscription information download method, a related device, and a system. When an eUICC of a terminal has no effective profile, the terminal can connect to and attach to a mobile network of an operator, and download a profile of a target operator by using a function-limited network connection provided by the operator, so that the terminal is successfully registered with a mobile network of the target operator by using the downloaded profile.

According to a first aspect, an embodiment of the present invention provides a profile download method, applied on a side of a terminal device. The method includes the following steps.

A terminal sends a first request to a first network device when an eUICC of the terminal has no effective profile. The first request is used to request a network connection for downloading a profile. Then, the terminal receives a response sent by the first network device for the first request. The response indicates that the first network device successfully establishes, for the terminal device, the network connection used for downloading the profile. Finally, after learning that the network connection is successfully established, the terminal downloads a profile by using the network connection.

According to a second aspect, an embodiment of the present invention provides a profile download method, applied on a side of a network device. The method includes the following steps.

The first network device receives a first request sent by a terminal. The first request is used to request to establish a network connection for downloading a profile. The first network device initiates, in response to the first request, a process of establishing, for the terminal, the network connection used for downloading the profile. After successfully establishing the network connection, the first network device returns a response to the first request to the terminal based on identification information of the terminal, to inform the terminal device that the network connection has been successfully established.

In the embodiments of the present invention, the first request includes a network identifier of a second network and the identification information of the terminal. The second network is a network of a target operator to which the terminal finally needs to attach. The identification information of the terminal is used to indicate, to a first network, a terminal from which the first request comes. Specifically, the identification information of the terminal may be an EID of the eUICC, an IMEI of the terminal, or a radio network temporary identifier allocated by the first network to the terminal.

In the embodiments of the present invention, the first network device may be a control plane entity (for example, an MME) of the first network, a user plane entity (for example, an SGW or a PGW) of the first network, a user database (for example, an HSS) of the first network, an entity (for example, an SM-DP) providing remote profile management in the first network, or the like. Similarly, a second network device may be a control plane entity (for example, an MME) of the second network, a user plane entity (for example, an SGW or a PGW) of the second network, a user database (for example, an HSS) of the second network, an entity (for example, an SM-DP) providing remote profile management in the second network, or the like.

The profile download methods provided in the embodiments of the present invention are described from the side of the terminal device and the side of the network device respectively in the first aspect and the second aspect. According to the profile download methods, when the eUICC of the terminal has no effective profile, the terminal can connect to and attach to a mobile network of an operator, and download a profile of the target operator by using a function-limited network connection provided by the operator, so that the terminal is successfully registered with a mobile network of the target operator by using the downloaded profile.

To implement the profile download methods described in the first aspect and the second aspect, the embodiments of the present invention provide the following two solutions:

Solution 1: The terminal randomly connects to and attaches to a mobile network of an operator, and downloads a profile of the target operator by using a function-limited network connection provided by the mobile network of the operator.

Solution 2: The terminal device purposely selects a mobile network of the target operator to connect and attach, and downloads a profile of the target operator by using a function-limited network connection provided by the mobile network of the target operator.

In Solution 1, specifically, the terminal may send the first request to the control plane entity of the first network by using a modem. Correspondingly, the control plane entity of the first network receives the first request. Then, specifically, the first network device may establish, through the following steps, the network connection used for downloading the profile:

The control plane entity of the first network selects the user plane entity of the first network, and sends a second request to the selected user plane entity of the first network, where the second request is used to request to establish the network connection for downloading the profile.

Correspondingly, the user plane entity of the first network responds to the second request, and establishes the network connection used for downloading the profile. After the network connection is established, the user plane entity of the first network returns a response to the second request to the control plane entity of the first network, to inform successful establishment of the network connection.

Optionally, the second request may include a download address of a profile in the second network, to trigger the user plane entity of the first network to set monitoring. The monitoring is used for limiting an address accessible by the terminal device by using the network connection to the address of the profile in the second network. In this way, the terminal can be prevented from performing, by using the network connection, other data access actions than downloading the profile in the second network, thereby facilitating traffic monitoring of the first network.

In Solution 1, the control plane entity of the first network may obtain the download address of the profile in the second network by using the following several possible implementations:

In a first possible implementation, the download address of the profile in the second network may come from the user database (for example, an HSS) of the second network. During specific implementation, a process of obtaining the download address of the profile in the second network may include: sending, by the control plane entity of the first network, a request to the user database (for example, an HSS) of the second network based on a PLMN ID of the second network, to request to obtain the download address of the profile in the second network. Correspondingly, the user database (for example, an HSS) of the second network responds to the request, and returns the download address of the profile in the second network to the control plane entity of the first network, so that the control plane entity of the first network may send the download address of the profile in the second network to the terminal. Optionally, the control plane entity of the first network does not need to add the download address of the profile in the second network to the response to the first request.

In a second possible implementation, the download address of the profile in the second network may come from the first network device. That is, the first network device (the control plane entity or the user plane entity) locally presets download addresses of profiles of various operators (including the download address in the second network). In this implementation scenario, the control plane entity of the first network may directly obtain the download address of the profile in the second network from the control plane entity of the first network or the user plane entity of the first network based on a PLMN ID of the second network. Optionally, the control plane entity of the first network does not need to add the download address of the profile in the second network to the response to the first request.

In a third possible implementation, the download address of the profile in the second network may come from the terminal. Specifically, the first request may include the download address of the profile in the second network. It may be understood that, in this implementation, the control plane entity of the first network does not need to add the download address of the profile in the second network to the response to the first request.

In Solution 1, when the first network and the second network are different networks, after the network connection is established, the user plane entity of the first network may send attribute information of the network connection to the control plane entity of the first network. Correspondingly, after receiving the attribute information, the control plane entity of the first network signs the attribute information. Herein, a signature for the attribute information is a charging credential of the first network for the second network. The terminal may add the signature when downloading the profile.

Optionally, after receiving the attribute information, the control plane entity of the first network may send the attribute information to the terminal, to trigger the terminal to sign the attribute information.

Herein, the attribute information of the network connection may include at least the identification information of the terminal, a network identifier of the first network, and identification information of the second network. Optionally, the attribute information of the network connection may further include an establishment time of the network connection.

In Solution 1, after the network connection is successfully established, the terminal may download the profile by using the following three possible implementations:

In a first possible implementation, the modem of the terminal informs an APP on the terminal of a message indicating successful establishment of the network connection. After learning that the network connection is successfully established, the APP on the terminal sends the download address of the profile in the second network to the eUICC of the terminal, to request the eUICC of the terminal to access the download address by using the network connection, thereby finally downloading the profile in the second network.

In a second possible implementation, the modem of the terminal informs an APP on the terminal of a message indicating successful establishment of the network connection. After learning that the network connection is successfully established, the APP on the terminal directly requests, based on the download address of the profile in the second network, to download the profile from a profile provider (for example, an SM-DP) in the second network.

In a third possible implementation, the modem of the terminal may directly trigger, after receiving the response to the first request, the eUICC of the terminal to download the profile in the second network by using the download address of the profile in the second network.

It should be noted that, during implementation of Solution 1, in a possible scenario, the network (that is, the first network) to which the terminal randomly connects is exactly a network that to which terminal finally intends to connect. In other words, the second network may be the same as the first network.

For Solution 2, the embodiments of the present invention provide two implementation scenarios:

In a first implementation scenario, the terminal is located within signal coverage of the target operator, and can selectively connect to and attach to the network of the target operator.

In a second implementation scenario, the terminal is not located within signal coverage of the target operator, and cannot connect to and attach to the network of the target operator.

In the first implementation scenario of Solution 2, the first network is a network to which the terminal selectively connects and attaches, namely, the network of the target operator.

In the first implementation scenario of Solution 2, considering traffic control, after the network connection is established, the user plane entity of the first network may monitor the network connection, so that the network connection is limited to being used only for downloading a profile in the first network. In this way, the terminal can be prevented from performing, by using the network connection, other data access actions than downloading the profile in the first network, thereby facilitating traffic monitoring of the first network.

It should be noted that, in the first implementation scenario of Solution 2, for specific implementation of establishing the network connection used for downloading the profile, specific implementation of obtaining the download address of the profile in the second network, and specific implementation of downloading the profile by the terminal, refer to related content in Solution 1, and details are not described herein again.

In the second implementation scenario of Solution 2, the first network is another network to which the terminal attempts to connect and attach when the terminal fails to selectively connect to and attach to the network of the target operator.

In the second implementation scenario of Solution 2, after receiving the first request, the control plane entity of the first network may further determine, based on the PLMN ID, whether establishment of the network connection used for downloading the profile is allowed.

In the second implementation scenario of Solution 2, if it is determined that establishment of the network connection used for downloading the profile is allowed, the control plane entity of the first network may select the user plane entity of the first network, and request the selected user plane entity of the first network to establish the network connection used for downloading the profile.

In the second implementation scenario of Solution 2, if it is determined that establishment of the network connection used for downloading the profile is allowed, the first network device (the control plane entity or the user plane entity) may further request the user plane entity of the second network to establish the network connection. Specifically, two implementations are included:

In a first implementation, if the control plane entity of the first network is configured with address information of a user plane entity of any operator that is configured to establish for downloading the profile, the control plane entity of the first network may select the user plane entity of the second network based on the network identifier of the second network, and request the selected user plane entity of the second network to establish the network connection used for downloading the profile. Correspondingly, the selected user plane entity of the second network responds to the request, and establishes the network connection used for downloading the profile.

In a second implementation, if the user plane entity of the first network is configured with address information of a user plane entity of any operator that is configured to establish for downloading the profile, the user plane entity of the first network may select the user plane entity of the second network based on the network identifier of the second network, and request the selected user plane entity of the second network to establish the network connection used for downloading the profile. Correspondingly, the selected user plane entity of the second network responds to the request, and establishes the network connection used for downloading the profile.

In the second implementation scenario of Solution 2, considering traffic control, if the network connection is established by the user plane entity of the first network, the user plane entity of the first network may further set the monitoring for the network connection. If the network connection is established by the user plane entity of the second network, the user plane entity of the second network may further set the monitoring for the network connection. The monitoring is used for limiting the network connection to a network connection used for downloading the profile.

With reference to Solution 1 or Solution 2, in the embodiments of the present invention, attachment of the terminal to the first network may include the following two implementations:

In a first implementation, the first request is used to not only request attachment to the first network but also request to establish the network connection to the first network.

In another implementation, before the terminal sends the first request to the control plane entity of the first network, the terminal may further send an attachment request to the control plane entity of the first network. Correspondingly, after receiving the attachment request, the control plane entity of the first network returns a response to the attachment request, to indicate that the terminal device successfully attaches to the first network.

It should be noted that, in the first implementation scenario of Solution 2, for specific implementation of obtaining the download address of the profile in the second network and specific implementation of downloading the profile by the terminal, refer to related content in Solution 1, and details are not described herein again.

According to a third aspect, an embodiment of the present invention provides a terminal. The terminal includes functional modules configured to implement the method according to the first aspect.

According to a fourth aspect, an embodiment of the present invention further provides a network device. The network device includes functional modules configured to implement the method according to the second aspect.

According to a fifth aspect, a terminal device is provided. The terminal device includes a memory and a processor, a transmitter, and a receiver that are coupled to the memory. The transmitter is configured to send data to the outside. The receiver is configured to receive data sent from the outside. The memory is configured to store implementation code in the method described in the first aspect. The processor is configured to execute the program code stored in the memory, that is, perform the method described in the first aspect.

According to a sixth aspect, a network device is provided. The network device includes a memory and a processor, a transmitter, and a receiver that are coupled to the memory. The transmitter is configured to send data to the outside. The receiver is configured to receive data sent from the outside. The memory is configured to store implementation code in the method described in the second aspect. The processor is configured to execute the program code stored in the memory, that is, perform the method described in the second aspect.

According to a seventh aspect, an embodiment of the present invention further provides a communications system. The communications system includes a terminal and a network device. The terminal is the terminal described in the third aspect, and the network device is the network device described in the fourth aspect. It should be noted that, the terminal may also be the terminal described in all content in the first aspect and the second aspect, and the network device may also be the first network device described in all the content in the first aspect and the second aspect.

According to an eighth aspect, an embodiment of the present invention further provides a computer storage medium. The computer storage medium stores program code. The program code includes instructions used for implementing any possible implementation in the method in the first aspect, the second aspect, the second aspect, or the third aspect.

According to the embodiments of the present invention, when the eUICC of the terminal has no effective profile, the terminal can connect to and attach to a mobile network of an operator, and download a profile of the target operator by using a function-limited network connection provided by the operator, so that the terminal is successfully registered with a mobile network of the target operator by using the downloaded profile.

BRIEF DESCRIPTION OF THE DRAWINGS

To describe the technical solutions in the embodiments of the present invention more clearly, the following briefly describes the accompanying drawings required for describing the embodiments.

DETAILED DESCRIPTION OF ILLUSTRATIVE EMBODIMENTS

Terms used in DESCRIPTION OF EMBODIMENTS in the present invention are merely intended to explain specific embodiments of the present invention rather than limit the present invention.

It should be understood that, in the prior art, a terminal (embedded with an eUICC) may download a profile mainly in the following two manners:

Manner 1: In a WiFi (Wireless Fidelity) signal coverage scenario, the terminal may connect to a network by using an embedded WiFi module, to access a download address of a profile provided by an operator, and finally download the profile.

Manner 2: In a mobile signal (for example, a 3G or 4G signal) coverage scenario, the terminal may be successfully registered with a mobile communications network by using an effective profile (for example, provisioning profile) in the eUICC, and then access, by using a network connection provided by the mobile communications network, a download address of a profile provided by an operator, to finally download a profile of a target operator. The effective profile refers to a subscription information set that is for signing a contract with an operator and connecting to an operator network and that can be authenticated by the operator.

It should be noted that, in the embodiments of the present invention, the profile of the target operator is downloaded at least when a network access condition in Manner 2 cannot be implemented, that is, at least when the eUICC has no effective profile. Alternatively, the profile of the target operator may be downloaded when the eUICC of the terminal device has no effective profile and the terminal device has no other network access capability (for example, accessing a network through WiFi enumerated in Manner 1).

Figure 1:
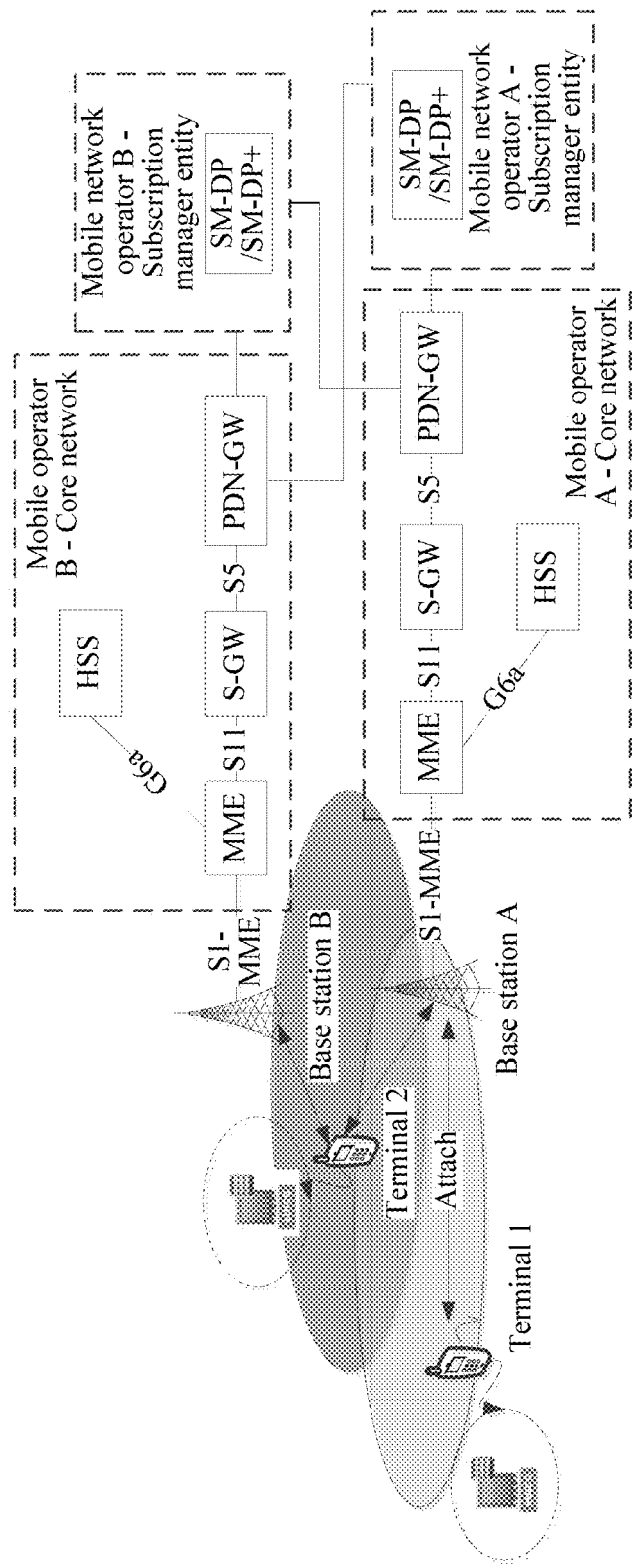
FIG. 1 is a schematic diagram of an application scenario according to an embodiment of the present invention.

Referring to FIG. 1, FIG. 1 is a schematic diagram of an application scenario according to an embodiment of the present invention. FIG. 1 shows a system architecture of an LTE communications system. In FIG. 1, terminal devices (for example, an MTC terminal 1 and an MTC terminal 2) need to access the Internet (Internet) by using an LTE mobile communications network. A core network of the LTE mobile communications network allocates network resources (for example, IP address resources and routing resources) to the MTC terminals for accessing the Internet, to establish network connections.

As shown in FIG. 1, the core network of the mobile communications network includes the following network elements:

Mobility management entity (MME, Mobility Management Entity): which is a control plane entity, and is responsible for functions such as mobility management, bearer management, user authorization and authentication, and user plane entity selection.

Serving gateway (SGW, Serving Gateway): which is a user plane entity, and is responsible for routing and processing user plane data and managing and storing IP bearer service parameters, network internal routing information, and the like of a terminal.

Packet data network gateway (PGW, PDN Gateway): which is a user plane entity, is a gateway for a terminal to connect to a PDN (Public Data Network), and is responsible for IP address assignment, policy enforcement, charging support, and the like. Usually, the PGW further includes a policy and charging enforcement function (PCEF, Policy and Charging Enforcement Function) entity.

Home Subscriber Server (HSS, Home Subscriber Server): which is a main database of the core network, and is responsible for managing user data.

It should be noted that, during actual implementation of hardware entities, the SGW and the PGW may be integrated.

In addition, as shown in FIG. 1, a mobile network operator further provides a subscription manager data preparation (Subscription Manager Data Preparation, SM-DP)

entity. The SM-DP is configured to provide subscription information for an eUICC of a terminal. In an actual application, the SM-DP may further be referred to as an SM-DP+ server, and is referred to as the SM-DP for short in this specification. In an actual application, downloading the subscription information may further be related to another subscription manager entity. This is not limited herein.

Usually, to access the Internet by using a mobile communications network provided by an operator, the terminal device needs to connect to the mobile network, then attach to the network, request the network to establish an IP bearer, and finally access the network by using the IP bearer established by the network.

In this embodiment of the present invention, at least when an eUICC of a terminal has no effective profile, the terminal may connect to the network by using identification information such as an EID (eUICC Identity, embedded universal integrated circuit card identity) or an IMEI (International Mobile Equipment Identification). It should be understood that, considering cyber security, because the eUICC of the terminal has no effective profile, attachment of the terminal to the network is special attachment, and is function-limited attachment. In this embodiment of the present invention, the terminal attaching to the network in such a manner can only request the network to establish a network connection used for downloading a profile.

As shown in FIG. 1, an MTC terminal device whose eUICC has no effective profile may be located within network signal coverage of one or more operators. For example, a terminal 2 in the figure is located within signal coverage of a mobile network operator A and a mobile network operator B, and a terminal 1 is located within signal coverage of only the mobile network operator A.

In this embodiment of the present invention, the terminal device whose eUICC has no effective profile may randomly select a mobile network of an operator for connection, or may purposely connect to a mobile network of a particular operator. After connecting to the mobile network, the terminal may perform a network attachment procedure, send a request to the attached network to request to establish a network connection used for downloading a profile, and access an SM-DP of a particular operator (for example, the operator B) by using the network connection, to download a profile of the particular operator to the eUICC of the terminal device. In this way, the terminal device may finally use the downloaded profile of the particular operator to normally attach to the mobile network of the particular operator.

It should be noted that, FIG. 1 shows only main network elements in the LTE communications system in this embodiment of the present invention. In an actual application, the communications system may further include other network elements. This is not limited herein.

It should be noted that, this embodiment of the present invention is not limited to the LTE communications system shown in FIG. 1, and may further be applied to another communications system, for example, a 3G communications system, a 5G communications system, or another communications system. The terminal in this embodiment of the present invention is not limited to the MTC terminal, and may also be a terminal device of another type and combined with an eUICC, for example, a terminal device of a consumption type (for example, a mobile phone).

An embodiment of the present invention provides a profile download method. When an eUICC has no effective profile, a terminal can connect to and attach to a mobile network of an operator, and download a profile of a target operator by using a function-limited network connection provided by the operator.

The network connection in this embodiment of the present invention refers to a mechanism of action that is for data exchange and that is created between the terminal and a network device. A specific representation of the network connection may be a PDN connection, a bearer, an IP tunnel, or the like.

First, two main design solutions provided in this embodiment of the present invention are described:

Solution 1: The terminal randomly connects to and attaches to a mobile network of an operator, and downloads the profile of the target operator by using a function-limited network connection provided by the mobile network of the operator.

Solution 2: The terminal device purposely selects a mobile network of the target operator to connect and attach, and downloads the profile of the target operator by using a function-limited network connection provided by the mobile network of the target operator.

Implementations of Solution 1 in this embodiment of the present invention are detailed below with reference to FIG. 2 to FIG. 4.

Figure 2:
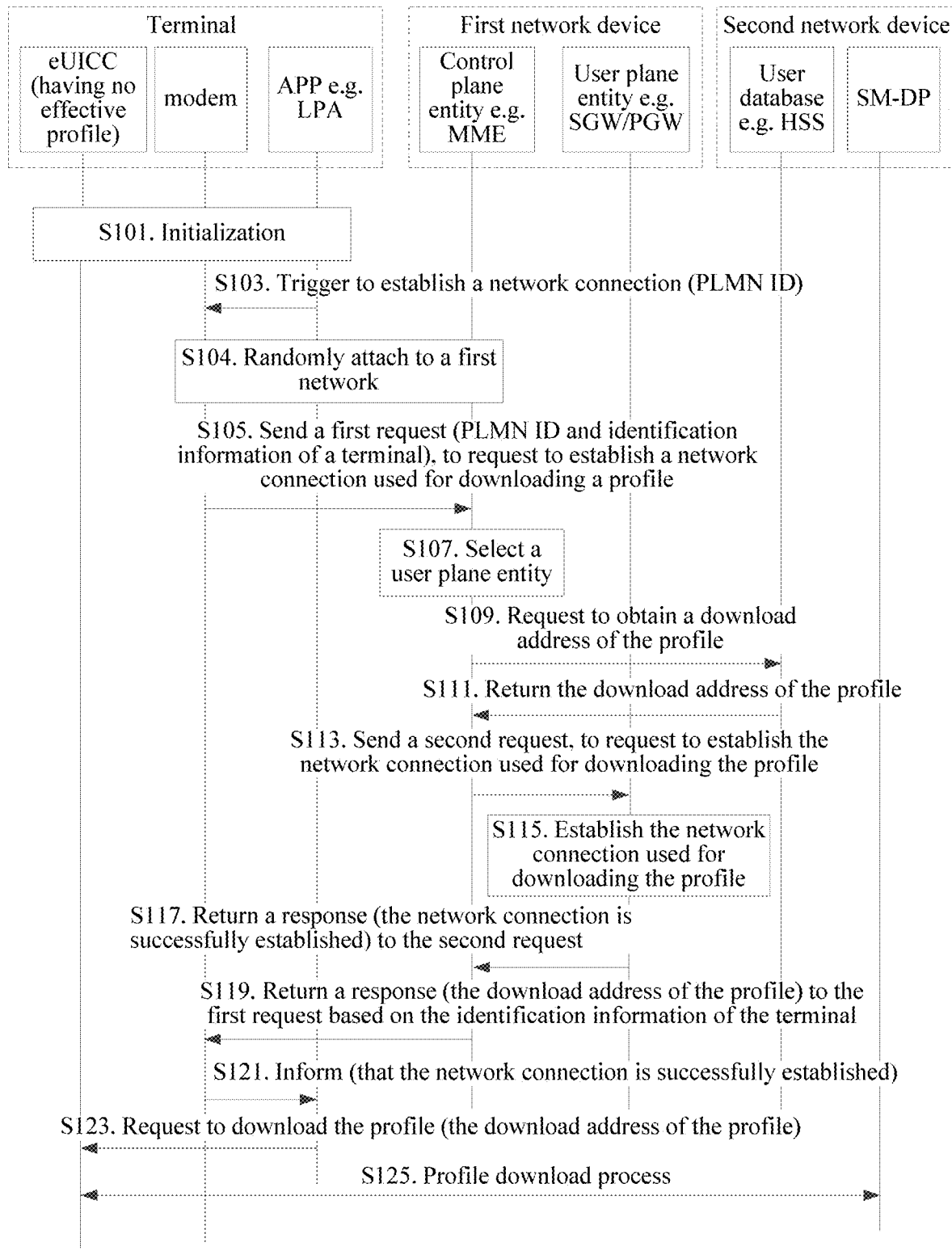
FIG. 2 is a schematic flowchart of a first embodiment of a profile download method according to an embodiment of the present invention.

Referring to FIG. 2, FIG. 2 is a schematic flowchart of an implementation of Solution 1 according to an embodiment of the present invention. A first network is the network to which the terminal randomly connects and attaches, and a second network is a network to which the terminal finally intends to normally attach (with which the terminal finally intends to be registered), that is, the network of the foregoing target operator. Because the eUICC of the terminal has no effective profile, attachment of the terminal to the first network is function-limited attachment. According to the method embodiment of FIG. 2, the terminal can download a profile in the second network by using a network connection used for downloading the profile and established for the terminal by using the first network to which the terminal randomly connects and attaches, to be finally registered with the second network by using the profile in the second network. As shown in FIG. 2, the method includes the following steps.

S105. The terminal sends a first request to a first network device at least when the eUICC of the terminal has no effective profile, where the first request is used to request to establish the network connection for downloading the profile.

S113 to S117. Correspondingly, the first network device receives the first request sent by the terminal, and the first network device initiates, in response to the first request, a process of establishing, for the terminal, the network connection used for downloading the profile. It should be understood that, the network connection is a communication connection between the terminal and the first network device. The terminal may access, by using the network connection, download addresses of profiles provided by some operators or any operator.

S119. After successfully establishing the network connection, the first network device returns a response to the first request to the terminal based on identification information of the terminal, to inform the terminal device that the network connection has been successfully established.

S121 to S125. After the network connection is successfully established, the terminal downloads the profile by using the network connection.

In this embodiment of the present invention, as shown in FIG. 2, the terminal may include the eUICC, a modem, and an APP. The modem is a modem of the terminal, is configured to receive and transmit a wireless mobile signal, and may be specifically a 4G or 5G communications module or the like. The APP (Application) is an application program on the terminal, is used to download a profile, and may be specifically an LPA (Local Profile Assistant, Chinese: local profile assistant).

In this embodiment of the present invention, the first network device may be a control plane entity (for example, an MME) of the first network, a user plane entity (for example, an SGW or a PGW) of the first network, a user database (for example, an HSS) of the first network, an entity (for example, an SM-DP) providing remote profile management in the first network, or the like. Similarly, a second network device may be a control plane entity (for example, an MME) of the second network, a user plane entity (for example, an SGW or a PGW) of the second network, a user database (for example, an HSS) of the second network, an entity (for example, an SM-DP) providing remote profile management in the second network, or the like.

The first request in this embodiment of the present invention includes request type indication information. The request type indication information may be data network type indication information (data network type) defined in a 5G communication protocol, or may be a request type (request type) defined in a 4G communication protocol. The first request is used to request to establish the network connection used for downloading the profile. For example, the request-type or the data network type is set to profile-download.

In the method embodiment corresponding to FIG. 2, the first request may include network identification information (PLMN ID) (PLMN: Public Land Mobile Network) of the second network and the identification information of the terminal. The second network is the network of the target operator providing the profile, that is, an operator network to which the profile to be downloaded by the terminal belongs. The identification information of the terminal is used to indicate, to the first network, a terminal from which the first request comes. Specifically, the identification information of the terminal may be an EID of the eUICC, an IMEI of the terminal, or a radio network temporary identifier (Radio Network Temporary Identity, RNTI) allocated by the first network to the terminal. During specific implementation, as shown in FIG. 2, S105 may be specifically: sending, by the terminal by using the modem, the first request to the control plane entity of the first network. Correspondingly, after receiving the first request, specifically, the first network device may establish, through the following steps, the network connection used for downloading the profile:

S107. The control plane entity of the first network selects a user plane entity.

Specifically, the control plane entity of the first network selects the user plane entity based on the request type indication information. In an implementation, the control plane entity of the first network may be configured with a plurality of APNs (Access Point Name) of the first network. Different APNs are identifiers of PDN networks carrying different services (for example, an IP multimedia subsystem IMS service and a multimedia message service), and correspond to different user plane entities of the first network. In this embodiment of the present invention, when the request type indication information is profile-download, the control plane entity of the first network selects, based on the request type indication information, an APN used for downloading the profile, and the APN used for downloading the profile corresponds to a special user p lane entity.

It should be understood that, the user plane entity selected by the control plane entity of the first network in response to the first request is the special user plane entity.

S113. The control plane entity of the first network sends a second request to the selected user plane entity of the first network, where the second request is used to request to establish the network connection for downloading the profile.

Specifically, the second request further includes identification information of the terminal. Specifically, the identification information of the terminal is the same as the identification information of the terminal that is received in the first request.

Optionally, the second request may further include a network identifier of the second network. The network identifier of the second network may be used by the first network to charge an operator indicated by the identifier of the second network.

The second request may further include the request type indication information in the first request or information about the APN selected in step 107, to indicate, to the user plane entity, that the second request is used to establish the network connection for downloading the profile.

S115. The user plane entity of the first network responds to the second request, and establishes the network connection used for downloading the profile.

S117. After the network connection is established, the user plane entity of the first network returns a response to the second request to the control plane entity of the first network, to inform successful establishment of the network connection.

In the method embodiment corresponding to FIG. 2, the response to the first request may include a download address of the profile in the second network, so that the terminal accesses the download address by using the network connection, to finally download the profile in the second network.

In the method embodiment corresponding to FIG. 2, the response to the first request may further include the network identifier of the second network. After receiving the response message for the first request, the terminal saves the network identifier of the second network, so that when downloading a profile in a third network subsequently, the terminal device determines whether a current network connection can be used for downloading the profile in the third network.

During specific implementation, as shown in FIG. 2, S119 may be specifically: receiving, by the terminal by using the modem, the response returned by the control plane entity of the first network for the first request. Correspondingly, after receiving the response to the first request, the terminal may download the profile by using the network connection through the following steps:

S121. The modem of the terminal informs the APP on the terminal of a message indicating successful establishment of the network connection.

In an actual application, the message indicating successful establishment of the network connection may be a response to triggering to establish the network connection in S103.

It should be noted that, in addition to receiving the notification of the modem mentioned in S121, the APP on the terminal may further periodically poll (polling) the network connection. If the network connection is found through polling, it indicates that the network connection is successfully established.

S123. After learning that the network connection is successfully established, the APP on the terminal sends the download address of the profile in the second network to the eUICC of the terminal, to request the eUICC of the terminal to access the download address by using the network connection, thereby finally downloading the profile in the second network.

S125. The eUICC of the terminal accesses the download address based on the download address of the profile that is sent by the APP on the terminal or the download address of the profile in the second network that is preset in the eUICC, requests to download the profile from a profile provider (for example, an SM-DP) in the second network, and saves the downloaded profile to the eUICC of the terminal.

It should be noted that, S121 to S125 are merely one manner of downloading the profile by the terminal provided in this embodiment of the present invention, and are relatively suitable to an M2M-type terminal. In an actual application, the terminal may alternatively download the profile in the following manners:

Implementation 1: For a terminal of a consumption type, after learning that the terminal device has a network connection, an APP on the terminal may request, based on the download address of the profile in the second network, to download the profile from a profile provider in the second network. Specifically, the download address of the profile in the second network is usually an address of a portal server. The APP on the terminal may first request, based on the address of the portal server, the portal server for an SM-DP address in the second network, and then request, based on the SM-DP address in the second network, to download the profile in the second network from the SM-DP in the second network, or may directly request to download the profile in the second network from the SM-DP in the second network.

Implementation 2: For an M2M-type terminal device, after receiving the response message for the first request, a modem of the terminal may trigger an eUICC of the terminal to download the profile in the second network.

In the method embodiment corresponding to FIG. 2, the download address of the profile in the second network may come from the user database (for example, an HSS) of the second network. During specific implementation, a process of obtaining the download address of the profile in the second network may include the following steps.

S109. The control plane entity of the first network sends a request to the user database (for example, an HSS) of the second network based on the PLMN ID of the second network, to request to obtain the download address of the profile in the second network.

S111. The user database (for example, an HSS) of the second network responds to the request, and returns the download address of the profile in the second network to the control plane entity of the first network, so that the control plane entity of the first network may send the download address of the profile in the second network to the terminal.

The download address of the profile in the second network may be one or more of SM-DP address list information, portal server address information, or SM-DS (Subscription Manager Discovery Service) server address information of the second network. This is not limited in this specification.

In this embodiment of the present invention, functions of the download address of the profile in the second network may include: First, the download address of the profile in the second network is carried in the response to the first request, so that the terminal requests, by using the download address of the profile in the second network, to download the profile in the second network. Second, the download address of the profile in the second network is used to perform traffic monitoring on the network connection, so that the terminal is limited to downloading only the profile in the second network by using the network connection. For specific implementation of the functions of the profile in the second network, refer to subsequent content.

It should be noted that, in a possible implementation scenario, the first network device (the control plane entity or the user plane entity) locally presets download addresses of profiles of various operators (including the download address in the second network). In this implementation scenario, the control plane entity of the first network may directly obtain the download address of the profile in the second network from the control plane entity of the first network or the user plane entity of the first network based on the PLMN ID of the second network.

Figure 3:
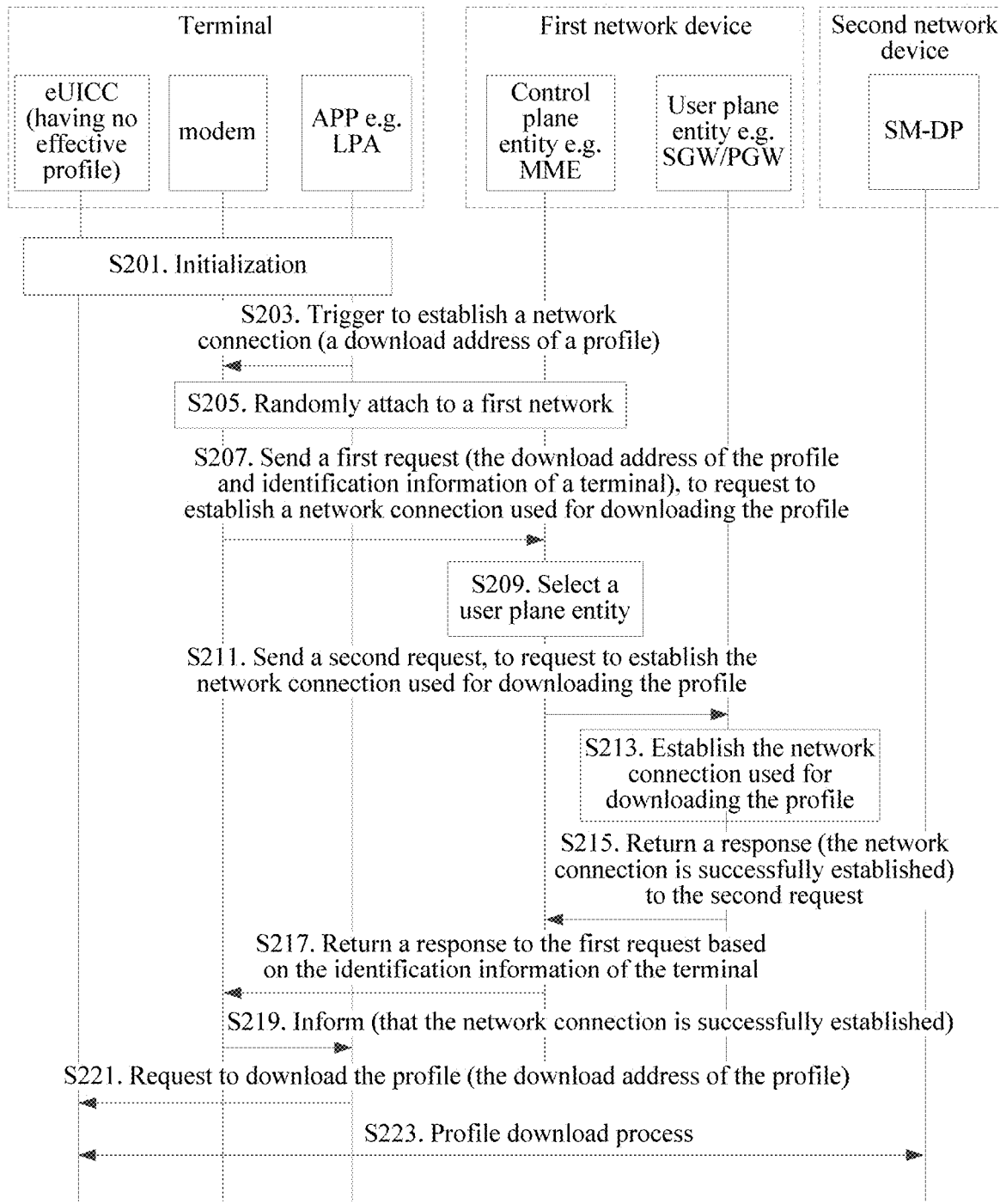
FIG. 3 is a schematic flowchart of a second embodiment of a profile download method according to an embodiment of the present invention.

Referring to FIG. 3, FIG. 3 is a schematic flowchart of another implementation of Solution 1 according to an embodiment of the present invention. A first network is a network to which the terminal randomly connects and attaches, and a second network is a network to which the terminal finally intends to normally attach, that is, the network of the foregoing target operator.

It can be learned from FIG. 3 that the method embodiment of FIG. 3 and the method embodiment of FIG. 2 have the following differences:

First, the first request sent by the terminal to the control plane entity of the first network includes the download address of the profile and the identification information of the terminal. That is, in the method embodiment of FIG. 3, the download address of the profile in the second network comes from the first request.

In this embodiment of the present invention, functions of the download address of the profile in the second network may include: First, the download address of the profile in the second network is carried in the response to the first request, so that the terminal requests, by using the download address of the profile in the second network, to download the profile in the second network. Second, the download address of the profile in the second network is used to perform traffic monitoring on the network connection, so that the terminal is limited to downloading only the profile in the second network by using the network connection. For specific implementation of the functions of the profile in the second network, refer to subsequent content.

Specifically, the download address of the profile in the second network is not limited to the address of the SM-DP server in the second network shown in FIG. 2, and may also be an address of a portal server used to process a subscription request in the second network or an address of an SM-DS (Discovery Service) server in the second network.

Second, in the method embodiment of FIG. 3, the control plane entity of the first network may directly obtain the download address of the profile in the second network from the first request.

It should be noted that, for content not mentioned in the method embodiment of FIG. 3, refer to the embodiment of FIG. 2, and details are not described herein again.

With reference to the method embodiment corresponding to FIG. 2 or FIG. 3, the following further describes other implementations of Solution 1.

In the method embodiment corresponding to FIG. 2 or FIG. 3, considering traffic control, after the network connection is established, the first network device may further set monitoring for the network connection, so that the network connection is limited to being used for downloading the profile in the second network. Specifically, the control plane entity of the first network may request the user plane entity of the first network to set the monitoring.

Specifically, the download address of the profile in the second network may be included in the second request. In this way, the terminal can be prevented from performing, by using the network connection, other data access actions than downloading the profile in the second network, thereby facilitating network traffic monitoring. In the embodiment of FIG. 2, as described in the embodiment of FIG. 2, the control plane entity of the first network obtains the download address of the profile in the second network from the user database, and further adds the download address of the profile in the second network to the second request. In the embodiment of FIG. 3, as described in the embodiment of FIG. 3, the control plane entity of the first network obtains the download address of the profile in the second network from the first request, and further adds the download address of the profile in the second network to the second request. In the method embodiment corresponding to FIG. 2 or FIG. 3, as shown in FIG. 4, an embodiment of the present invention further provides an implementation of performing, by the user plane entity of the first network, traffic charging on an action of downloading the profile by the terminal. Specifically, the following two implementations (as shown by rectangular dashed boxes in FIG. 4) are included.

Implementation 1

Step 1. After the network connection is established, the user plane entity of the first network generates attribute information of the network connection, and sends the attribute information of the network connection to the control plane entity of the first network, as shown in S301. Specifically, the attribute information of the network connection may be included in the response message for the second request. The attribute information of the network connection may include at least the identification information of the terminal, a network identifier of the first network, and identification information of the second network. Optionally, the attribute information of the network connection may further include an establishment time of the network connection.

Step 2. The control plane entity of the first network signs the attribute information, as shown in S303. Specifically, a signature for the attribute information is a charging credential of the first network for the second network.

Step 3. The control plane entity of the first network sends the signature for the attribute information to the terminal. Correspondingly, the terminal receives the signature, as shown in S305. Specifically, the signature for the attribute information may be included in the response message for the first request.

Step 4. The terminal adds, when requesting to download the profile from the second network, the obtained signature of the attribute information. For example, the terminal sends a download request to a profile provider entity (for example, an SM-DP) in the second network, to request to download the profile in the second network. The download request includes the signature. For a specific implementation of downloading the profile by the terminal, refer to related content in the embodiment in FIG. 2, and details are not described herein again.

Implementation 2

Step 1. After the network connection is established, the user plane entity of the first network generates attribute information of the network connection, and sends the attribute information of the network connection to the control plane entity of the first network, as shown in S301. Specifically, the attribute information of the network connection may be included in the response message for the second request. The attribute information of the network connection may include at least the identification information of the terminal, a network identifier of the first network, and identification information of the second network. Optionally, the attribute information of the network connection may further include an establishment time of the network connection.

Step 2. The control plane entity of the first network sends the received attribute information to the terminal, as shown in S309. Specifically, a signature for the attribute information may be included in the response message for the first request.

Step 3. After receiving the attribute information, the terminal signs the attribute information, as shown in S313. Specifically, the terminal receives the attribute information by using the modem, and then the modem may send the attribute information to the APP on the terminal, as shown in S311, so that the APP on the terminal signs the attribute information, as shown in S313.

Step 4. The terminal adds, when requesting to download the profile from the second network, the obtained signature of the attribute information. For example, the terminal sends a download request to a profile provider entity (for example, an SM-DP) in the second network, to request to download the profile in the second network. The download request includes the signature. For a specific implementation of downloading the profile by the terminal, refer to related content in the embodiment in FIG. 2, and details are not described herein again.

In the process of downloading, by the eUICC of the terminal, the profile by using the network connection, the first network records the attribute information of the network connection of the terminal, encrypts the attribute information by using a signature of a network side entity or a signature of the terminal device, and sends the attribute information to the second network, to indicate, to the second network, that the profile in the second network is downloaded by using the first network. Finally, when the first network charges the second network, the first network may send the signed attribute information to the second network, so that the second network performs transaction verification on the charging, and executes a transaction.

Figure 4:
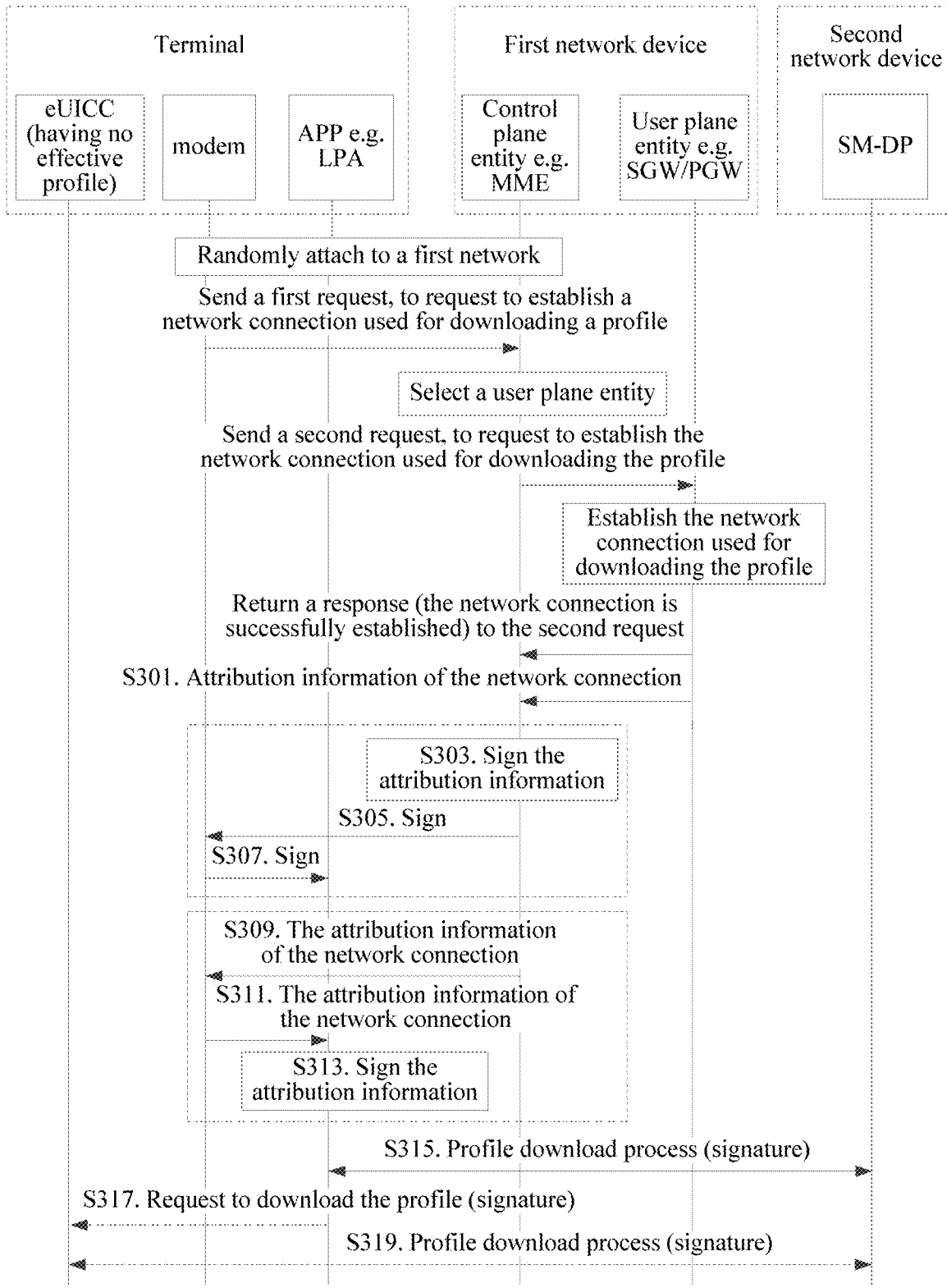
FIG. 4 is a schematic flowchart of setting traffic charging for downloading a profile according to an embodiment of the present invention.

It may be understood that, the traffic charging procedure shown in FIG. 4 is suitable for application to a scenario in which the first network and the second network are different networks. In a possible implementation scenario, the network (that is, the first network) to which the terminal randomly connects is exactly the network to which the terminal finally intends to connect. In other words, the second network may be the same as the first network.

Implementations of Solution 2 in this embodiment of the present invention are detailed below with reference to FIG. 5 to FIG. 7B. It is assumed that the network of the target operator is a network that an end user finally intends to be registered with. This embodiment of the present invention provides two implementation scenarios for Solution 2:

In a first implementation scenario, the terminal is located within signal coverage of the target operator, and can selectively connect to and attach to the network of the target operator.

In a second implementation scenario, the terminal is not located within signal coverage of the target operator, and cannot connect to and attach to the network of the target operator.

Figure 5:
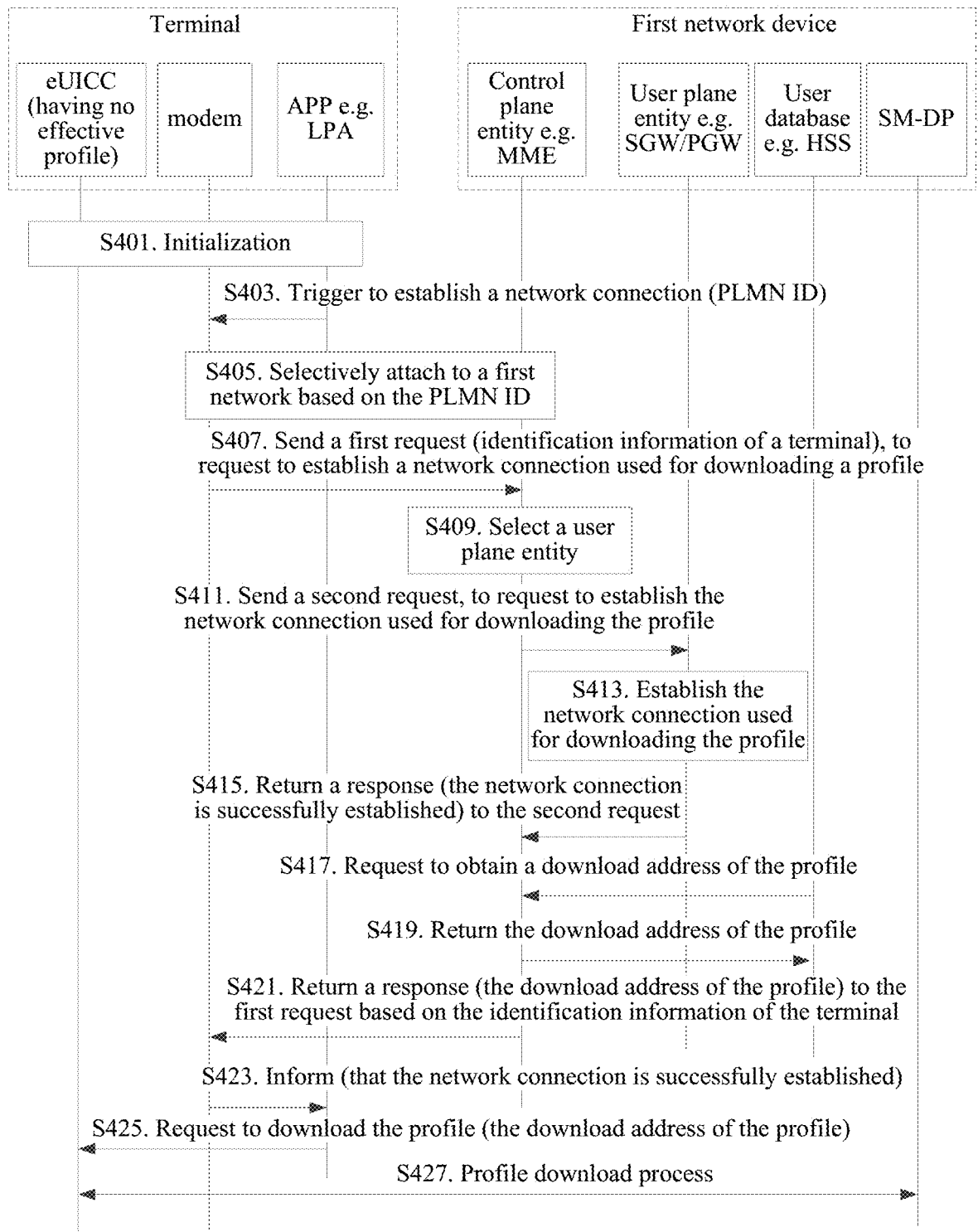
FIG. 5 is a schematic flowchart of a third embodiment of a profile download method according to an embodiment of the present invention.

Referring to FIG. 5, FIG. 5 is a schematic flowchart of implementing Solution 2 in the first implementation scenario. A first network is the network of the target operator. According to the method embodiment of FIG. 5, the terminal can selectively connect to and attach to the first network, download a profile in the first network by using a network connection established by the first network, and finally be registered with the first network based on the profile in the first network. As shown in FIG. 5, the method includes the following steps.

S405. The terminal selectively connects to and attaches to the first network based on a network identifier (PLMN ID) of the target operator. It should be understood that, the first network is the network of the target operator. The PLMN ID may be shown in S403.

The terminal may obtain a network identifier of the target operator in the following several manners:

Manner 1. An APP on the terminal sends the network identifier to a modem of the terminal.

During specific implementation, the terminal may obtain the network identifier of the target operator (that is, a network identifier of an operator network to which the to-be-downloaded profile belongs) from a codeword used for downloading a profile in a second network or a codeword used for requesting a subscription from a server in the second network. The codeword used for downloading the profile in the second network is also referred to as an activation code. The codeword used for requesting the subscription from the server in the second network is also referred to as an enhanced activation code. The definitions are also applicable in the following descriptions. Alternatively, the terminal may select, from operator information obtained in a network selection process, the network identifier of the target operator to which the terminal intends to connect. Alternatively, the network identifier of the target operator to which the terminal intends to connect or a target operator network identifier list is preset on the terminal device. Before attaching to the first network, the terminal device obtains the network identifier of the target operator or selects, from the target operator network identifier list, a target operator to which the terminal intends to connect, to obtain an identifier of the target operator, and further connects to and attaches to the network of the target operator to download the profile in the network of the target operator.

Manner 2. The eUICC of the terminal presets the network identifier of the target operator or a target operator network identifier list. Before attaching to the first network, the terminal device obtains, from the eUICC, the network identifier of the target operator or selects, from the target operator network identifier list, a target operator to which the terminal intends to connect, to obtain an identifier of the target operator, and further connects to and attaches to the network of the target operator to download the profile in the network of the target operator.

S407. The terminal sends a first request to a control plane entity of the first network by using a modem, to request to establish a network connection used for downloading a profile. In the method embodiment corresponding to FIG. 5, the first request includes identification information of the terminal. For descriptions of the identification information of the terminal, refer to related content in Solution 1, and details are not described herein again.

The first request further includes request type indication information. The request type indication information may be data network type indication information (data network type) defined in a 5G communication protocol, or may be a request type (request type) defined in a 4G communication protocol. The first request is used to request to establish the network connection used for downloading the profile. For example, the request-type or the data network type is set to profile-download.

Optionally, the first request may further include the network identifier PLMN ID of the target operator.

S409. Correspondingly, the control plane entity of the first network receives the first request sent by the terminal, and the control plane entity of the first network selects a user plane entity. The user plane entity is responsible for establishing the network connection used for downloading the profile. For details about how the control plane entity of the first network selects the user plane entity, refer to related content in Solution 1, and details are not described herein again.

S411 to S415. The control plane entity of the first network requests the selected user plane entity of the first network to establish the network connection. For details, refer to related content in Solution 1, and details are not described herein again.

S421. The control plane entity of the first network returns a response to the first request based on the identification information of the terminal, to inform the terminal that the network connection has been successfully established.

Specifically, the response to the first request may include a download address of the profile in the first network. The download address of the profile in the first network refers to SM-DP address information for storing information about the profile. During actual use, the download address of the profile in the first network may further be another address used for downloading the profile in the first network, for example, an address of a portal server or an address of an SM-DS. This is not limited in the present invention. The download address of the profile in the first network is obtained in the following several manners.

Manner 1. The download address of the profile is preset in the control plane entity of the first network.

Manner 2. The download address of the profile is preset in the user plane entity of the first network. The user plane entity of the first network obtains the download address of the profile based on a second request message, and adds the download address of the profile to a response message for the second request, so that the control plane entity of the first network obtains the download address of the profile.

Manner 3. The download address of the profile in the first network is obtained from a user database, for example, an HSS, of the first network. Specifically, as shown in FIG. 5, after obtaining the response message for the second request, the control plane entity of the first network may send a profile download address request message to the user database, for example, an HSS, of the first network, to request the operator network for information about an address used for downloading the profile. The user database of the first network returns a profile download address response message, and adds the download address of the profile in the first network to the response message.

S423 to S427. After the network connection is successfully established, the terminal downloads the profile in the first network by using the network connection. The present invention is not limited to the manner of downloading the profile by the terminal shown in FIG. 5. For specific implementation of downloading the profile by the terminal, refer to related content in Solution 1.

In the embodiment corresponding to FIG. 5, considering traffic control, after the network connection is established, the first network needs to monitor the network connection, so that the network connection is limited to being used for downloading the profile in the first network. In other words, the network connection established by the user plane entity of the first network is only allowed for downloading the profile in the first network. Specifically, the user plane entity of the first network may perform the monitoring based on the download address of the profile in the first network, to prevent the terminal from performing, by using the network connection, other data access actions than downloading the profile in the first network, thereby facilitating traffic monitoring of the first network.

Figure 6:
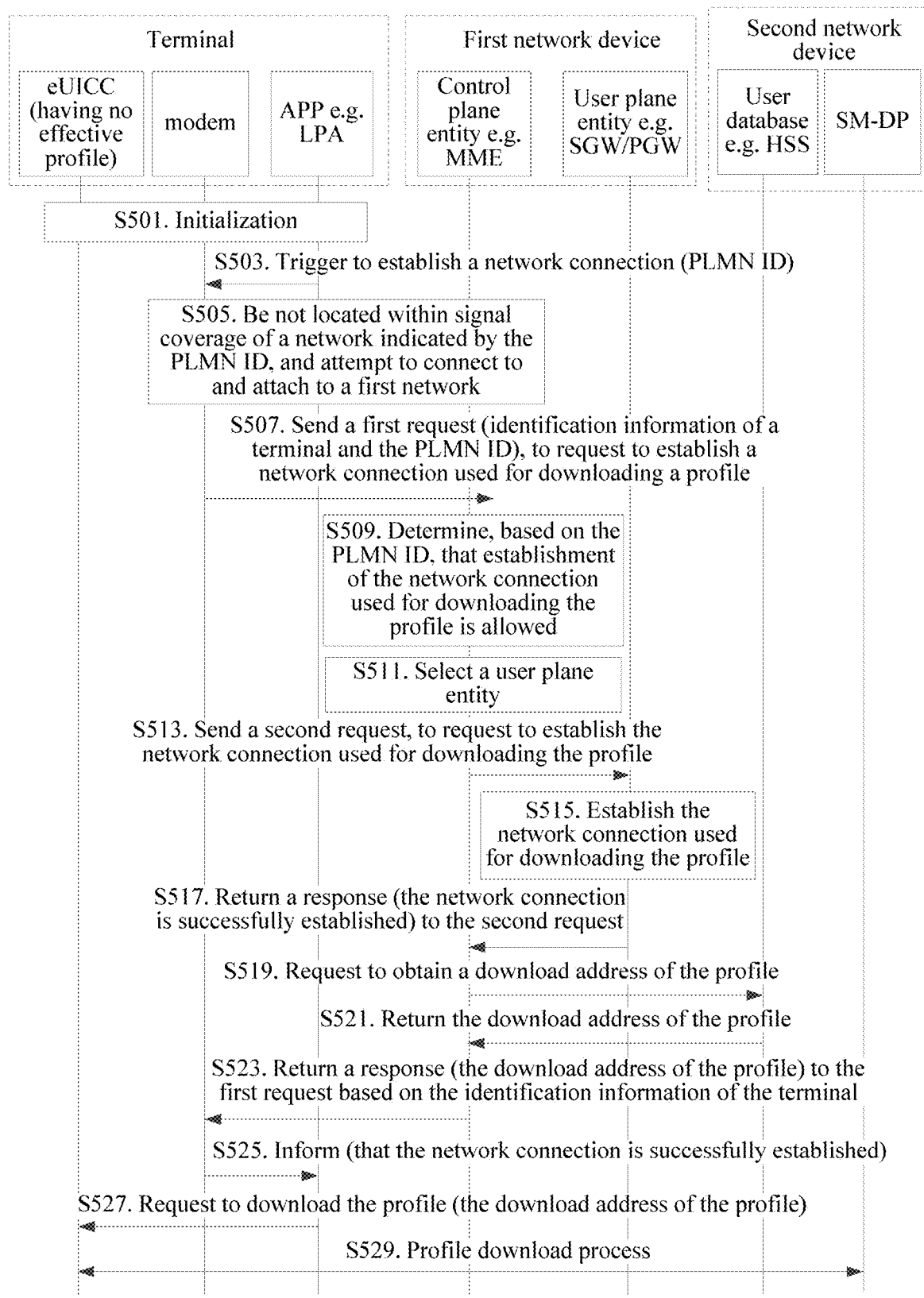
FIG. 6 is a schematic flowchart of a fourth embodiment of a profile download method according to an embodiment of the present invention.

Referring to FIG. 6, FIG. 6 is a schematic flowchart of implementing Solution 2 in the second implementation scenario. In the method embodiment corresponding to FIG. 6, a second network is the network of the target operator. In the scenario to which this embodiment is applied, a network identifier of the target operator is preset in the terminal device or the eUICC, or the terminal device obtains an identifier of the target operator from a codeword used for downloading a profile in the second network or a codeword used for requesting a subscription from a server in the second network. However, the terminal is not located within signal coverage of the second network. In the second scenario, the terminal attempts to connect to and attach to a first network, download the profile in the second network by using a function-limited network connection provided by the first network, and finally be registered with the second network by using the profile in the second network. As shown in FIG. 6, the method includes the following steps.

S505. The terminal is not located within signal coverage of a network (that is, the second network) indicated by a PLMN ID, and attempts to connect to and attach to the first network. Herein, the PLMN ID is a network identifier of the second network, and the second network is the network of the target operator. As shown in S503, the PLMN ID may be sent by an APP on the terminal to a modem of the terminal.

During specific implementation, the terminal may obtain the network identifier of the target operator (that is, a network identifier of an operator network to which the to-be-downloaded profile belongs) from the codeword used for downloading the profile in the second network or the codeword used for requesting the subscription from the server in the second network. Alternatively, the network identifier of the target operator to which the terminal intends to connect or a target operator network identifier list is preset on the terminal device. Before attaching to the first network, the terminal device obtains the network identifier of the target operator or selects, from the target operator network identifier list, a target operator to which the terminal intends to connect, to obtain an identifier of the target operator, and further connects to and attaches to the network of the target operator to download the profile in the network of the target operator.

An optional implementation is: The eUICC of the terminal presets the network identifier of the target operator or a target operator network identifier list. Before attaching to the first network, the terminal device obtains, from the eUICC, the network identifier of the target operator or selects, from the target operator network identifier list, a target operator to which the terminal intends to connect, to obtain an identifier of the target operator, and further connects to and attaches to the network of the target operator to download the profile in the network of the target operator.

S507. The terminal sends a first request to a control plane entity of the first network by using the modem, to request to establish a network connection used for downloading a profile. In the method embodiment corresponding to FIG. 6, the first request includes identification information of the terminal and the PLMN ID. For descriptions of the identification information of the terminal, refer to related content in Solution 1, and details are not described herein again.

The first request further includes request type indication information. The request type indication information may be data network type indication information (data network type) defined in a 5G communication protocol, or may be a request type (request type) defined in a 4G communication protocol. The first request is used to request to establish the network connection used for downloading the profile. For example, the request-type or the data network type is set to profile-download.

S509. Correspondingly, the control plane entity of the first network receives the first request sent by the terminal, and the control plane entity of the first network determines, based on the PLMN ID, whether establishment of the network connection used for downloading the profile is allowed.

Specifically, in the implementation scenario corresponding to FIG. 6, if the network (that is, the second network) indicated by the PLMN ID and the first network have a collaboration agreement, establishment of the network connection is allowed. S509 is not limited to the implementation scenario corresponding to FIG. 6, and may further be applied to another embodiment in the present invention, for example, the method embodiment corresponding to FIG. 5 and Solution 1. In an actual application, the first network and the second network may further agree on, according to an actual requirement, a condition of allowing establishment of the network connection. This is not limited in this embodiment of the present invention.

S511. If it is determined that establishment of the network connection used for downloading the profile is allowed, the control plane entity of the first network selects a user plane entity. The user plane entity is responsible for establishing the network connection used for downloading the profile. For details about how the control plane entity of the first network selects the user plane entity, refer to related content in Solution 1, and details are not described herein again.

S513 to S517. The control plane entity of the first network requests the user plane entity of the first network to establish the network connection. For details, refer to related content in Solution 1, and details are not described herein again.

S523. The control plane entity of the first network returns a response to the first request based on the identification information of the terminal, to inform the terminal that the network connection has been successfully established.

Specifically, the response to the first request may include a download address of the profile in the second network. The download address of the profile in the second network may be obtained in the following two manners.

Manner 1. The download address of the profile is preset in the user plane entity of the first network. The user plane entity of the first network obtains the download address of the profile based on a second request message, and adds the download address of the profile to a response message for the second request, so that the control plane entity of the first network obtains the download address of the profile.

Manner 2. As shown in FIG. 6, the download address of the profile in the second network may be provided by a user database, for example, an HSS, of the second network. For specific implementation of obtaining the download address of the profile in the second network by using the user database, refer to related content in Solution 1, and details are not described herein again.

In the method embodiment corresponding to FIG. 6, the response to the first request may further include the network identifier of the second network. After receiving the response message for the first request, the terminal saves the network identifier of the second network, so that when downloading a profile in a third network subsequently, the terminal device determines whether a current network connection can be used for downloading the profile in the third network.

S525 to S529. After the network connection is successfully established, the terminal downloads a profile in the first network by using the network connection. The present invention is not limited to the manner of downloading the profile by the terminal shown in FIG. 6. For specific implementation of downloading the profile by the terminal, refer to related content in Solution 1.

In the method embodiment corresponding to FIG. 6, considering traffic control, the user plane entity of the first network may further set monitoring for the network connection, so that the network connection is limited to being used for downloading the profile. In this way, the terminal can be prevented from performing, by using the network connection, other data access actions than downloading the profile, thereby ensuring network data security and facilitating network traffic monitoring. A process of setting the monitoring is similar to specific implementation in Solution 1. That is, when the terminal device does not have the download address of the profile in the second network, the control plane entity of the first network obtains the download address of the profile in the second network from the HSS, and sends the download address of the profile in the second network to the user plane entity of the first network, for traffic control. Alternatively, the user plane entity of the first network may preset the download address of the profile in the second network, and obtain the download address of the profile in the second network based on the network identifier of the second network in the second request, to perform traffic control. When the terminal device includes the download address of the profile in the second network, the terminal device may add the download address of the profile in the second network to the first request message. The control plane entity of the first network obtains the download address of the profile in the second network by using the first request message, and sends the download address of the profile in the second network to the user plane entity of the first network by using the second request message, so that the user plane entity of the first network performs traffic control based on the download address of the profile in the second network.

In the method embodiment corresponding to FIG. 6, the user plane entity of the first network may further perform traffic charging for an action of downloading the profile by the terminal. For details, refer to FIG. 4 and related content in Solution 1, and details are not described herein again.

Figure 7A:
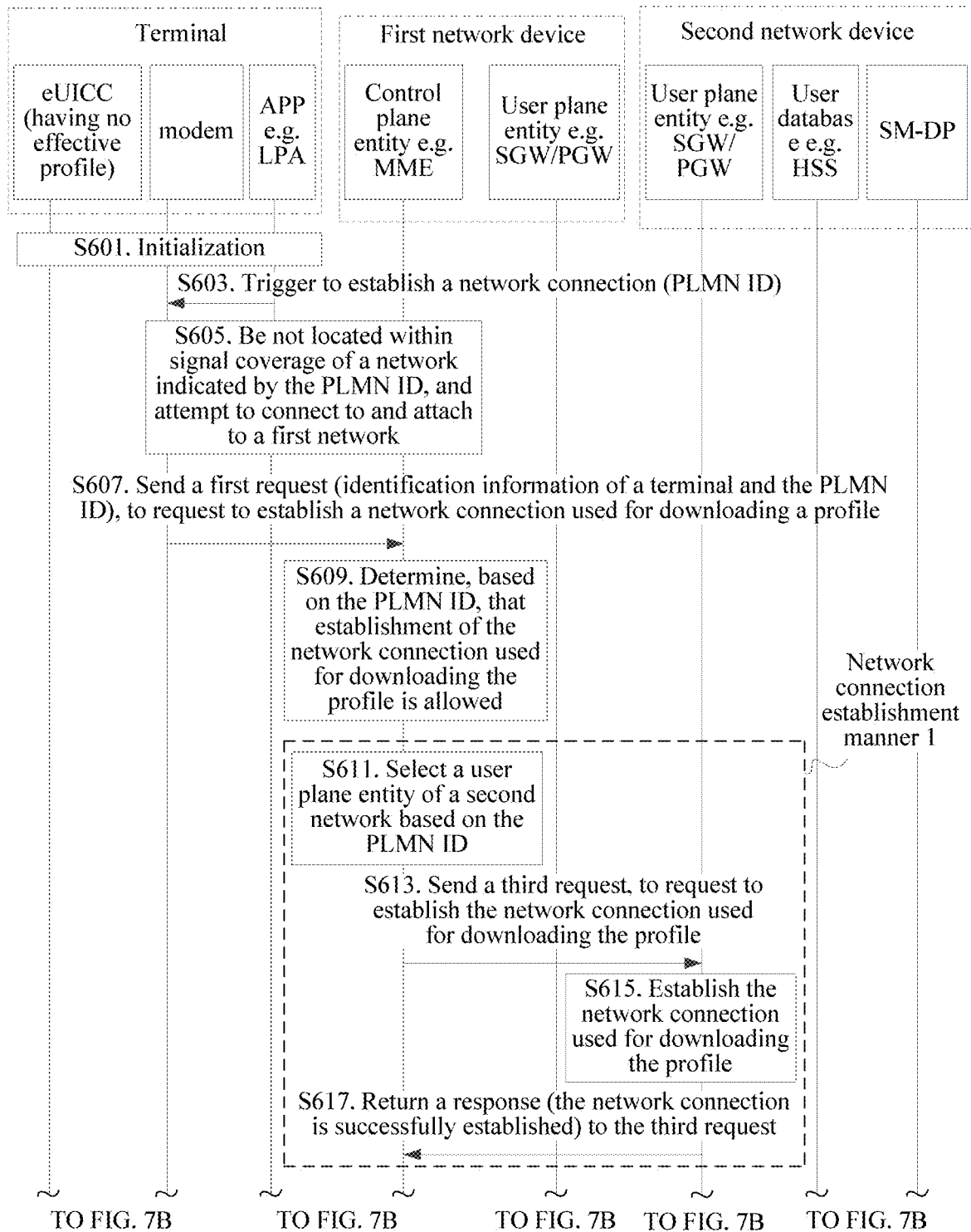
FIG. 7A and FIG. 7B are a schematic flowchart of a fifth embodiment of a profile download method according to an embodiment of the present invention.
Figure 7B:
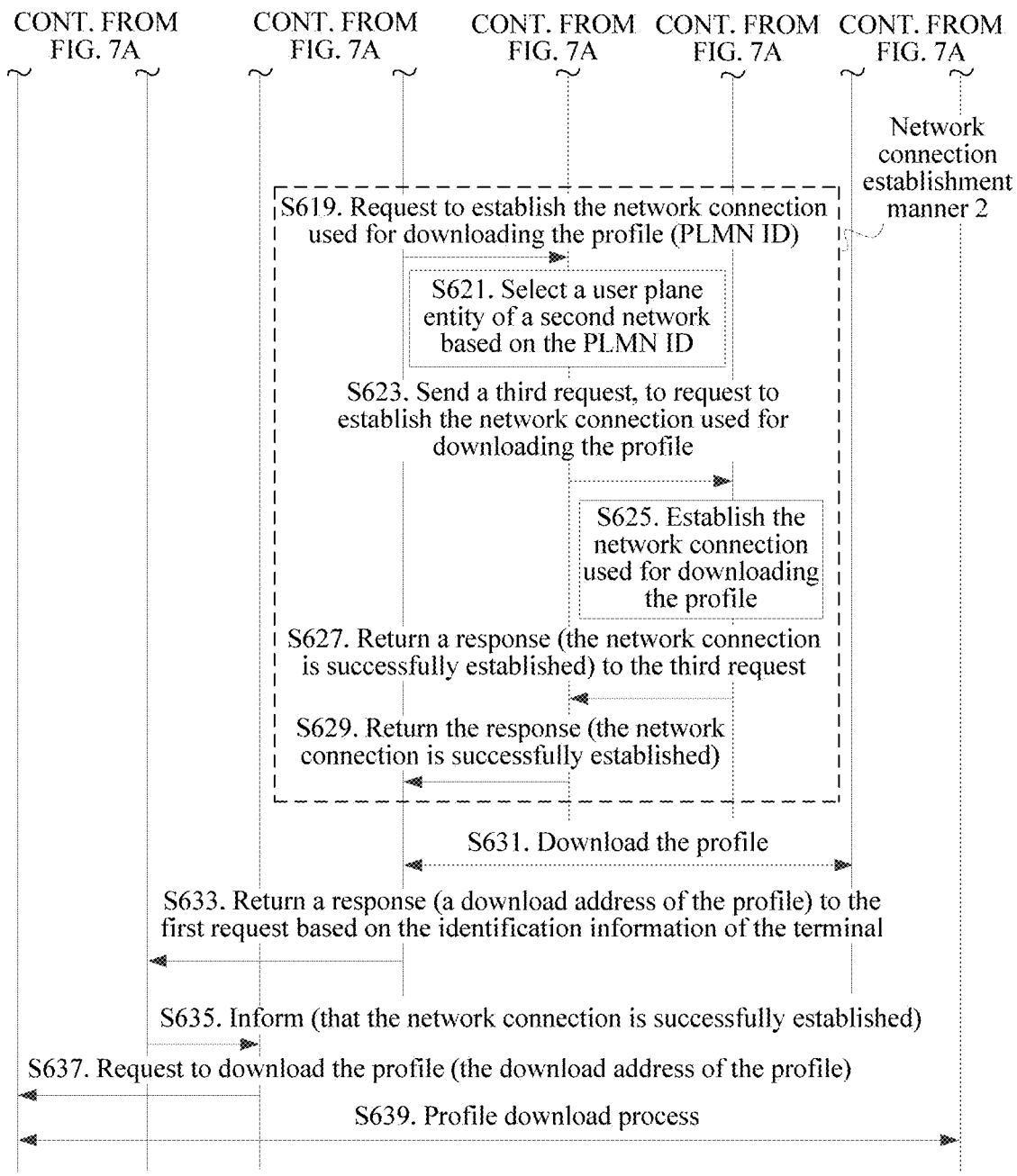

Referring to FIG. 7A and FIG. 7B, FIG. 7A and FIG. 7B are another schematic flowchart of implementing Solution 2 in the second implementation scenario. A scenario of the method embodiment corresponding to FIG. 7A and FIG. 7B is the same as the scenario of the method embodiment corresponding to FIG. 6. A second network is the network of the target operator, but the terminal is not located within signal coverage of the second network. In the second scenario, the terminal attempts to connect to and attach to a first network. The first network requests the second network to establish a network connection used for downloading a profile. Finally, the terminal may download a profile in the second network by using the network connection established by the second network.

It can be learned through comparison by using the method embodiment of FIG. 6 that, a manner of establishing a network connection used for downloading a profile in a second network in the method embodiment corresponding to FIG. 7A and FIG. 7B is different from that in the embodiment of FIG. 6. Specifically, the following two manners of establishing the network connection (as shown by rectangular dashed boxes in the figure) are included:

When a control plane entity of the first network is configured with address information of a special user plane entity of any operator, a first network connection establishment manner in FIG. 7A and FIG. 7B is implemented. Herein, the special user plane entity of any operator is responsible for establishing a network connection used for downloading a profile. As shown in FIG. 7A and FIG. 7B, the first network connection establishment manner includes the following steps.

S611. When request type indication information included in the first request instructs to establish the network connection used for downloading the profile, the control plane entity of the first network selects a user plane entity of the second network based on a PLMN ID of the second network and a preset correspondence between the PLMN ID and an address of the special user plane entity.

Specifically, the control plane entity of the first network may further determine APN information based on the request type indication information, where the determined APN represents that the network connection used for downloading the profile is established. It should be understood that, the selected user plane entity of the second network is a special user plane entity, and the special user plane entity is responsible for establishing the network connection used for downloading the profile in the second network.

S613. The control plane entity of the first network sends a third request to the selected user plane entity of the second network, to request to establish the network connection for downloading the profile.

The third request includes identification information of a user (the terminal), and the identification information of the terminal is the same as a user identifier received in the first request.

The third request message may further include the request type indication information or the determined APN information, to instruct the user plane entity of the second network to establish the network connection used for downloading the profile.

S615. Correspondingly, the selected user plane entity of the second network receives the third request, and the selected user plane entity of the second network establishes the network connection used for downloading the profile.

S617. After establishing the network connection, the selected user plane entity of the second network returns a response to the third request to the control plane entity of the first network.

When a user plane entity of the first network is configured with address information of a special user plane entity of any operator, a second network connection establishment manner in FIG. 7A and FIG. 7B is implemented. Herein, the special user plane entity of any operator is responsible for establishing the network connection used for downloading the profile. As shown in FIG. 7A and FIG. 7B, the second network connection establishment manner includes the following steps.

S619. A control plane entity of the first network sends, based on request type indication information included in a first request to the user plane entity of the first network that is configured with the address information of the special user plane entity, a request for establishing the network connection. Specifically, the request carries a PLMD ID (that is, a network identifier of the second network) included in the first request and identification information of the terminal.

Specifically, the control plane entity of the first network may further determine APN information based on the request type indication information, where the determined APN represents that the network connection used for downloading the profile is established.

Therefore, the request that is for establishing the network connection and that is sent to the user plane entity of the first network may further include the request type indication information or the APN information determined based on the request type indication information, to instruct the user plane entity of the first network to establish the network connection used for downloading the profile.

S621. Correspondingly, the user plane entity of the first network receives the request, and the user plane entity of the first network selects a user plane entity of the second network based on the PLMN ID of the second network that is carried in the request and a preset correspondence between the PLMN ID and an address of the special user plane entity.

It should be understood that, the selected user plane entity of the second network is a special user plane entity, and the special user plane entity is responsible for establishing the network connection used for downloading the profile in the second network.

S623. The user plane entity of the first network sends a third request to the selected user plane entity of the second network, to request to establish the network connection for downloading the profile.

The third request includes the identification information of the terminal, and the identification information of the terminal is the same as a user identifier received in the first request.

The third request message may further include the request type indication information or the determined APN information, to instruct the user plane entity of the second network to establish the network connection used for downloading the profile.

S625. Correspondingly, the selected user plane entity of the second network receives the third request, and the selected user plane entity of the second network establishes the network connection used for downloading the profile.

S627. After establishing the network connection, the selected user plane entity of the second network returns a response to the third request to the user plane entity of the first network.

S629. After receiving the response to the third request, the user plane entity of the first network returns a response to the control plane entity of the first network, to inform successful establishment of the network connection.

In the method embodiment corresponding to FIG. 7A and FIG. 7B, considering traffic control, the user plane entity of the second network may further set monitoring for the network connection, so that the network connection is limited to being used for downloading the profile.

Based on the first network connection establishment manner in FIG. 7A and FIG. 7B, the control plane entity of the first network may request the selected user plane entity of the second network to set the monitoring. The request may include a download address of the profile in the second network. In this way, the terminal can be prevented from performing, by using the network connection, other data access actions than downloading the profile in the second network, thereby ensuring network data security and facilitating network traffic monitoring.

Based on the first network connection establishment manner in FIG. 7A and FIG. 7B, the user plane entity of the first network (configured with) may request the selected user plane entity of the second network to set the monitoring. The request may include a download address of the profile in the second network. In this way, the terminal can be prevented from performing, by using the network connection, other data access actions than downloading the profile in the second network, thereby ensuring network data security and facilitating network traffic monitoring.

It should be noted that, for content not mentioned in the method embodiment of FIG. 7A and FIG. 7B, refer to the method embodiment of FIG. 6, and details are not described herein again.

With reference to Solution 1 or Solution 2, in the embodiments of the present invention, attachment of the terminal to the first network may include the following two implementations:

In a first implementation, the first request is used to not only request to establish the network connection to the first network but also request attachment to the first network. The first request is an attachment request (attach request).

Specifically, the first request may further include attachment type indication information (attach type). The attachment type indication information is used to indicate that the first request is initiated by a terminal device having no effective profile. For example, the attach type is set to non-subscription. Correspondingly, the response to the first request is further used to indicate that attachment of the terminal is successful.

In another implementation, the first request is used to request to establish the network connection used for downloading the profile. For example, the first request may be a PDN (packet data network, packet data network) connection establishment request or session establishment request message. Before the terminal sends the first request to the control plane entity of the first network, the terminal may further send an attachment request to the control plane entity of the first network. Correspondingly, after receiving the attachment request, the control plane entity of the first network returns a response to the attachment request, to indicate that the terminal device successfully attaches to the first network.

Specifically, the attachment request may include the attachment type indication information (attach type), indicating that the attachment request is initiated by a terminal device having no effective profile. For example, the attach type is set to non-subscription. In addition, the attachment request may further include the identification information of the terminal device, used to indicate, to the first network, a terminal that the attachment request comes from. Specifically, the identification information of the terminal may be an EID of the eUICC, an IMEI of the terminal, or an RNTI allocated by the first network to the terminal.

Figure 8:
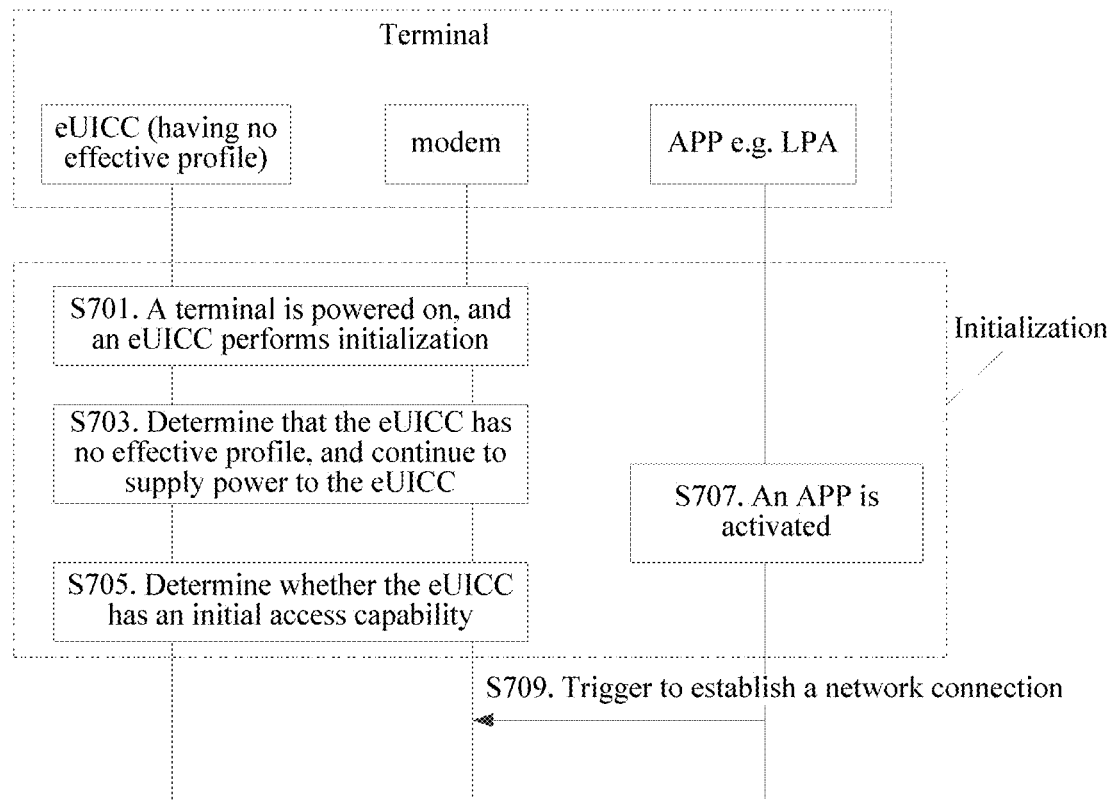
FIG. 8 is a schematic flowchart of initializing a terminal according to an embodiment of the present invention.

With reference to Solution 1 or Solution 2, in the embodiments of the present invention, as shown in FIG. 8, an initialization process on a terminal side may include the following steps.

S701. When the terminal is powered on, a universal integrated card in the terminal performs initialization. The universal integrated card is a SIM/UICC card in the terminal, and is the eUICC in this specification.

S703. The terminal determines that the universal integrated card has no effective profile, and continues to supply power to the eUICC.

S705. The terminal determines whether the universal integrated card has an initial access capability. In this embodiment of the present invention, if the universal integrated card has an initial access capability, the universal integrated card randomly connects to a network according to Solution 1 or selectively connects to a network of an operator according to Solution 2. The initial access capability means that the terminal can still connect to a network to download a profile when the universal integrated card in the terminal has no effective profile.

In a possible implementation, if in a process of performing an answer to reset by the universal integrated card in the terminal, a specified bit of the answer to reset is a preset value. For example, if T4 in ATR response information is set to a special value indicating that the universal integrated card has an initial access capability, it is determined that the universal integrated card has an initial access capability. In another possible implementation, if a specified application program category in the universal integrated card includes a network access application (Network Access Application, NAA), it is determined that the eUICC has an initial access capability. In a possible implementation, if the universal integrated card in the terminal device is an embedded universal integrated card, namely, the eUICC, it is determined that the universal integrated card has an initial access capability.

S707. The APP used for downloading a profile on the terminal is activated. A specific activation manner may be boot activation or activation triggered by a user. The activated APP may obtain the PLMN ID of the target operator, and trigger the modem of the terminal to establish an initial connection to a mobile communications network. The modem of the terminal device selects any network to attach, and establishes an initial connection used for downloading subscription information.

With reference to Solution 1 or Solution 2, in the embodiments of the present invention, the modem of the terminal may be triggered, in the following two manners, to send the first request: In a possible implementation, if the modem of the terminal determines that the eUICC of the terminal has no effective profile, the modem of the terminal may send the first request through self-triggering, to request to establish the network connection. In another possible implementation, after the APP on the terminal is activated, the activated APP may obtain the PLMN ID of the target operator, and trigger the modem of the terminal to send the first request, to request to establish the network connection.

Figure 9:
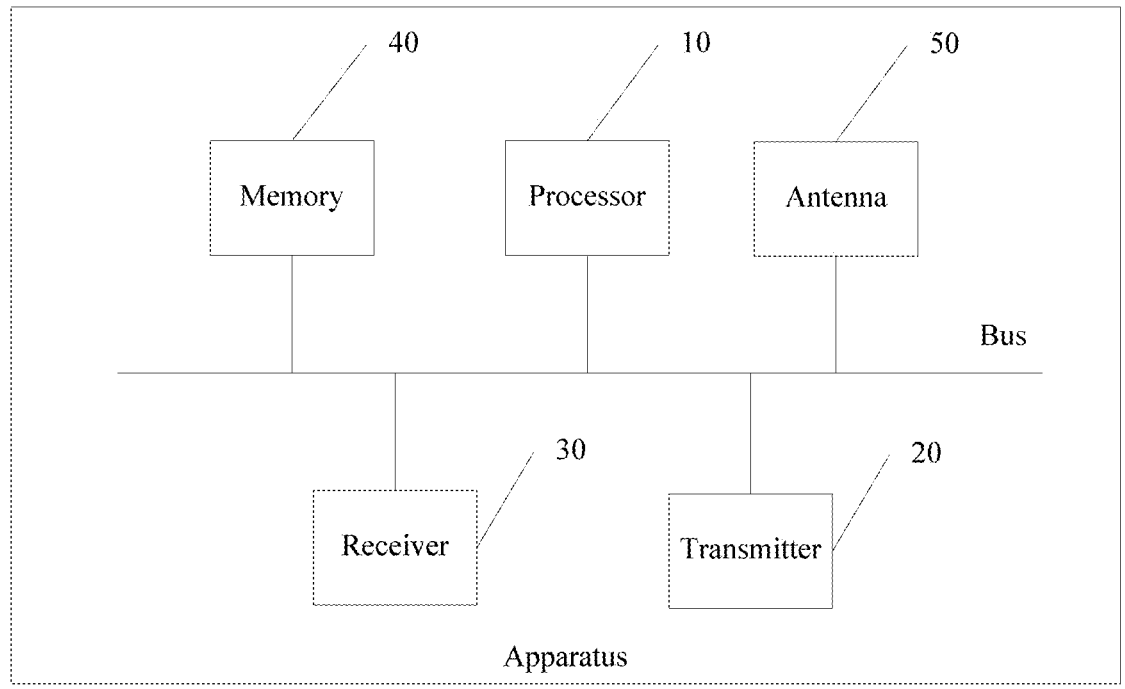
FIG. 9 is a structural diagram of an apparatus according to an embodiment of the present invention.

Based on a same inventive concept, an embodiment of the present invention further provides an apparatus (as shown in FIG. 9). The apparatus is configured to implement the methods described in the embodiments respectively corresponding to FIG. 2 to FIG. 7B.

When the apparatus is a network device, a processor 10 is configured to: receive, by using a receiver 30, a first request sent by a terminal device, initiate a process of establishing, for the terminal device, a network connection used for downloading a profile, and finally return, by using a transmitter 20, a response message for the first request to the terminal device, to inform the terminal device that the network connection has been successfully established.

In this embodiment of the present invention, the first request is sent by the terminal device at least when the terminal device has no effective profile, and the first request is used to request to establish the network connection for downloading the profile.

It may be understood that, for specific steps performed by the processor 10, refer to functions of the first network device in the embodiments respectively corresponding to FIG. 2 to FIG. 7B, and details are not described herein again.

When the apparatus is a terminal device, a processor 30 is configured to: send, by using a transmitter 20, a first request to a first network device, and then receive, by using a receiver 30, a response message returned by the first network device for the first request. The response message indicates that the first network device successfully establishes, for the terminal device, the network connection used for downloading the profile. Finally, the processor 30 requests, by using the network connection, to download the profile.

In this embodiment of the present invention, the first request is sent by the terminal device at least when the terminal device has no effective profile, and the first request is used to request to establish the network connection for downloading the profile.

It may be understood that, for specific steps performed by the processor 10, refer to functions of the terminal device in the embodiments respectively corresponding to FIG. 2 to FIG. 7B, and details are not described herein again.

Based on the same inventive concept, an embodiment of the present invention further provides a terminal device. The terminal device includes functional modules configured to perform method steps related to the terminal in the embodiments respectively corresponding to FIG. 2 to FIG. 7B. According to the detailed descriptions in the embodiments respectively corresponding to FIG. 2 to FIG. 7B, a person skilled in the art may clearly know an implementation method of the terminal device in this embodiment. For brevity, details are not described herein again.

Based on the same inventive concept, an embodiment of the present invention further provides a network device. The network device includes functional modules configured to perform method steps related to the first network device in the embodiments respectively corresponding to FIG. 2 to FIG. 7B. According to the detailed descriptions in the embodiments respectively corresponding to FIG. 2 to FIG. 7B, a person skilled in the art may clearly know an implementation method of the network device in this embodiment. For brevity, details are not described herein again.

In addition, an embodiment of the present invention further provides a communications system, including a terminal device and a network device. The terminal device may be the terminal device shown by the apparatus in FIG. 9, and the network device may be the network device shown by the apparatus in FIG. 9. It should be noted that, the terminal device may also be the terminal in the embodiments respectively corresponding to FIG. 2 to FIG. 7B, and the network device may also be the first network device in the embodiments respectively corresponding to FIG. 2 to FIG. 7B. Details are not described herein again.

According to the embodiments of the present invention, when the eUICC has no effective profile, the terminal can connect to and attach to a mobile network of an operator, and download the profile of the target operator by using a function-limited network connection provided by the operator.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
   sending, by a terminal device, based on the terminal device having no effective profile, a first request message to a first network device of a first mobile network operator, wherein the first request message requests to establish a function-limited network connection for downloading a profile, wherein the function-limited network connection is for a limited purpose of downloading the profile;
   receiving, by the terminal device, a first response message returned by the first network device in response to the first request message, wherein the first response message indicates that the first network device has successfully established, for the terminal device, the function-limited network connection for downloading the profile, wherein the first response message comprises attribute information of the function-limited network connection, the attribute information having been generated by the first mobile network operator and comprising identification information of the terminal device, network identification information of the first mobile network operator, and identification information of a second mobile network operator;
   signing, by the terminal device, the attribute information;
   adding the signed attribute information when downloading the profile;
   requesting, by the terminal device, to download the profile using the function-limited network connection; and
   indicating, to a second network to which the profile belongs, that the function-limited network connection used for downloading the profile belongs to the first mobile network operator.

2. The method according to claim 1, wherein the first request message comprises network identification information of the second mobile network operator, and the profile to be downloaded by the terminal device belongs to the second mobile network operator.

3. The method according to claim 1, wherein the first response message comprises address information of the profile to be downloaded by the terminal device.

4. The method according to claim 3, wherein:
   the address information of the profile to be downloaded by the terminal device is locally obtained by a control plane entity of the first mobile network operator from the first network device; or
   the address information of the profile to be downloaded by the terminal device is obtained by the control plane entity of the first mobile network operator from a user database of a second network device based on the network identification information of the second mobile network operator comprised in the first request message, wherein the profile to be downloaded by the terminal device belongs to the second mobile network operator.

5. The method according to claim 1, wherein the first request message comprises request type indication information, and the request type indication information instructs the first network device to establish the function-limited network connection for downloading the profile.

6. The method according to claim 1, wherein the first request message comprises attachment type indication information, wherein the attachment type indication information indicates that the first request message is initiated by the terminal device that has no effective profile, and the first response message is indicates successful attachment of the terminal device.

7. The method according to claim 1, wherein before sending, by the terminal device, the first request message to the first network device, the method further comprises:
   sending, by the terminal device, an attachment request to the first network device, wherein the attachment request comprises attach type indication information, and the attach type indication information indicate that the attachment request is initiated by the terminal device that has no effective profile; and
   receiving, by the terminal device, a second response message returned by the first network device, wherein the second response message for the attachment request indicates that the terminal device has successfully attached to the first network device, and the second response message is sent by the first network device in response to the attachment request.

8. The method according to claim 7, wherein the attachment request further comprises the identification information of the terminal device, and the identification information of the terminal device comprises identification information of a universal integrated card in the terminal device, a device identifier of the terminal device, or a temporary network identifier of the terminal device.

9. The method according to claim 1, wherein the first request message further comprises the identification information of the terminal device, and the identification information of the terminal device comprises identification information of a universal integrated card in the terminal device, a device identifier of the terminal device, or a temporary network identifier of the terminal device.

10. The method according to claim 1, wherein the first response message further comprises credential information, the credential information comprises a signature for the attribute information of the function-limited network connection, and the credential information is carried in a download message when the terminal device downloads the profile, to indicate, to the second mobile network operator to which the profile belongs, that the function-limited network connection used for downloading the profile belongs to the first mobile network operator.

11. The method according to claim 1, wherein before sending, by the terminal device, the first request message to the first network device, the method further comprises:
    determining whether a universal integrated card in the terminal device has an initial access capability.

12. The method according to claim 11, wherein the determining whether the universal integrated card in the terminal device has the initial access capability comprises:
    determining that the universal integrated card has the initial access capability when, in a process of performing an answer to a reset by the universal integrated card in the terminal device, a specified bit of the answer to the reset is a preset value; or
    determining that the universal integrated card has the initial access capability when a specified application program category in the universal integrated card comprises a preset application program used to connect to a first network; or
    determining that the universal integrated card in the terminal device has the initial access capability when the universal integrated card in the terminal device is an embedded universal integrated card.

13. The method according to claim 1, wherein the first network device belongs to a first mobile network; and
    wherein:
        the first mobile network is an initial access network randomly selected by the terminal device; or
        the first mobile network is an initial access network selected by the terminal device based on network identification information of an mobile network operator to which the profile to be downloaded by the terminal device belongs.

14. The method according to claim 13, further comprising:
    obtaining, by the terminal device from an activation code or an enhanced activation code, the network identification information of the mobile network operator to which the profile to be downloaded belongs; or
    selecting, from operator information obtained in a public land mobile network (PLMN) selection process, the network identification information of the mobile network operator to which the profile to be downloaded belongs; or
    obtaining, from preset operator information, the network identification information of the mobile network operator to which the profile to be downloaded belongs.

* * * * *